United States Patent
Tanner et al.

(10) Patent No.: US 10,928,841 B2
(45) Date of Patent: Feb. 23, 2021

(54) SEAL SECTION CHECK VALVE WITH PROTECTION TUBE

(71) Applicant: Baker Hughes, a GE Company, LLC, Houston, TX (US)

(72) Inventors: David Tanner, Broken Arrow, OK (US); Ryan Semple, Owasso, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 0 days.

(21) Appl. No.: 16/656,763

(22) Filed: Oct. 18, 2019

(65) Prior Publication Data
US 2020/0133316 A1  Apr. 30, 2020

Related U.S. Application Data

(60) Provisional application No. 62/750,922, filed on Oct. 26, 2018.

(51) Int. Cl.
| | |
|---|---|
| E21B 43/12 | (2006.01) |
| G05D 16/04 | (2006.01) |
| G05D 16/06 | (2006.01) |
| F16K 15/04 | (2006.01) |
| F04D 13/08 | (2006.01) |
| F04D 29/06 | (2006.01) |
| F04D 7/04 | (2006.01) |

(52) U.S. Cl.
CPC ....... *G05D 16/0402* (2019.01); *E21B 43/128* (2013.01); *F04D 13/086* (2013.01); *F04D 29/061* (2013.01); *F16K 15/04* (2013.01); *G05D 16/06* (2013.01); *F04D 7/04* (2013.01)

(58) Field of Classification Search
CPC .. G05D 16/0402; G05D 16/06; F04D 13/086; F04D 7/04; F04D 29/061; F16K 15/04; E21B 43/128
USPC ........................................................ 166/378
See application file for complete search history.

(56) References Cited

U.S. PATENT DOCUMENTS

| | | | |
|---|---|---|---|
| 7,665,975 B2 | 2/2010 | Parmeter et al. | |
| 8,221,092 B2 | 7/2012 | Chilcoat et al. | |
| 2007/0140876 A1* | 6/2007 | Parmeter | E21B 43/128 417/423.11 |
| 2014/0202681 A1 | 7/2014 | Merrill et al. | |
| 2015/0023805 A1 | 1/2015 | Pyron et al. | |
| 2016/0076550 A1* | 3/2016 | Collins | E21B 43/128 417/410.1 |
| 2016/0145984 A1 | 5/2016 | Tetzlaff et al. | |
| 2017/0037861 A1 | 2/2017 | Rutter et al. | |

OTHER PUBLICATIONS

International Search Report and Written Opinion of PCT Application No. PCT/US2019/057283 dated Feb. 5, 2020: pp. 1-11.

* cited by examiner

*Primary Examiner* — Taras P Bemko
(74) *Attorney, Agent, or Firm* — Bracewell LLP; James E. Bradley

(57) ABSTRACT

A submersible well pump assembly has a communication path for communicating motor lubricant to an interior of a pressure equalizer. A check valve passage with a check valve leads from the communication path to a pressure equalizing chamber. A dip tube has a dip tube inlet at the check valve passage below the check valve and a dip tube outlet in the pressure equalizing chamber. The dip tube is filled with motor lubricant to retard migration of well fluid from the pressure equalizing chamber into contact with the check valve.

15 Claims, 2 Drawing Sheets

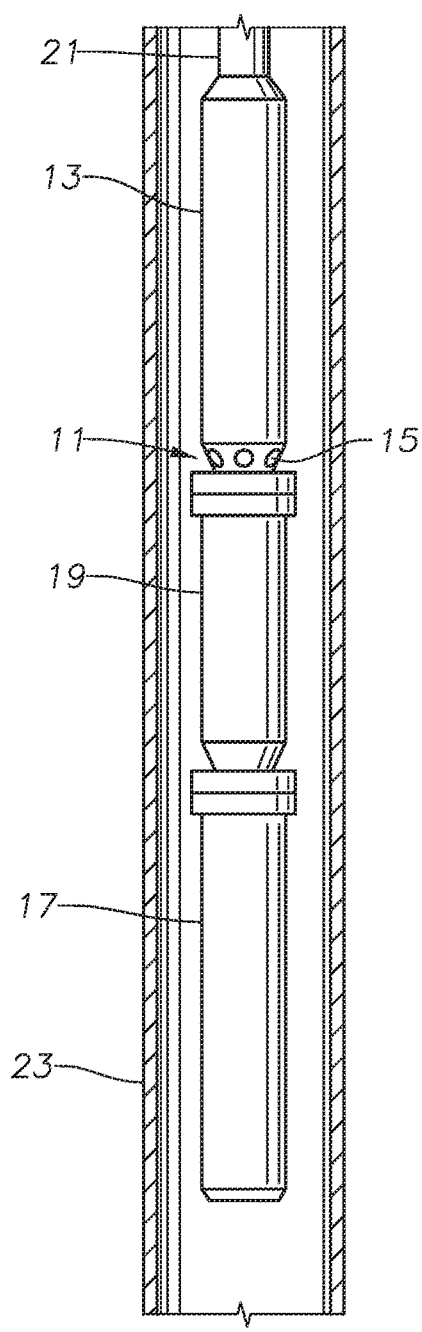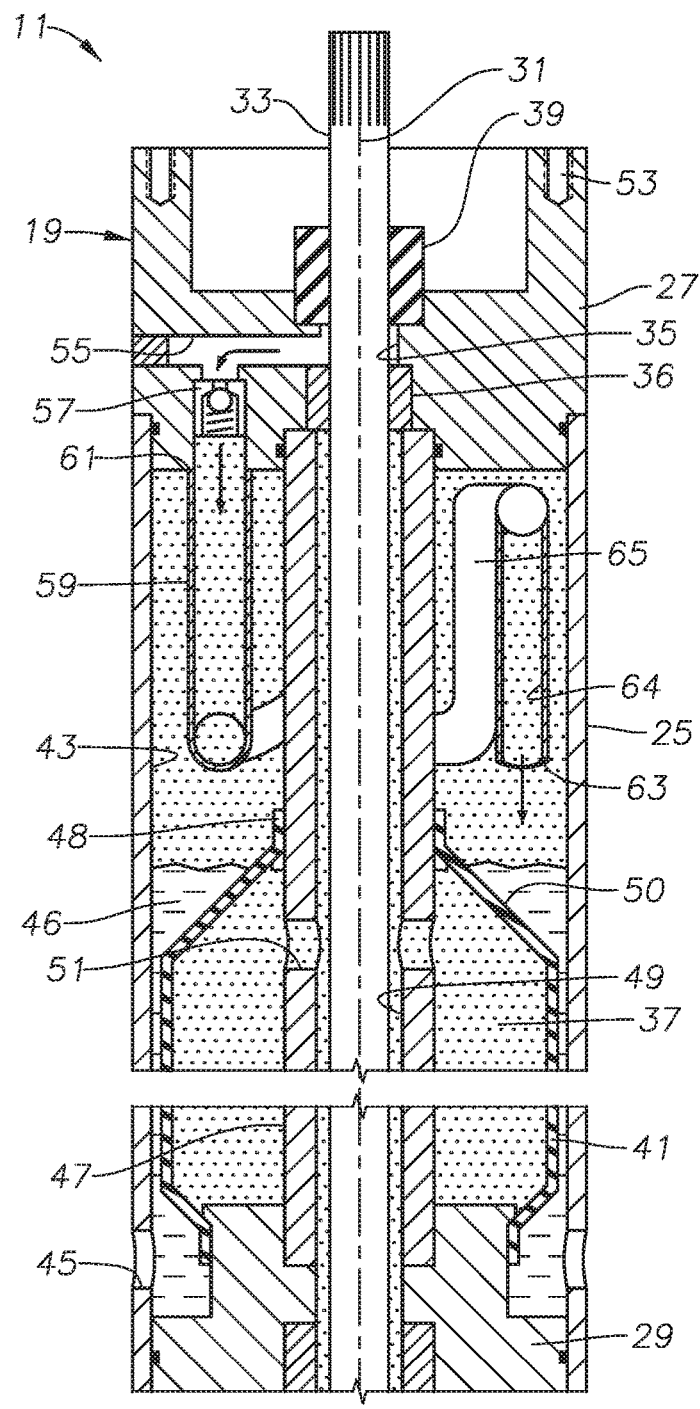
FIG. 1
FIG. 2

SEAL SECTION CHECK VALVE WITH PROTECTION TUBE

CROSS-REFERENCE TO RELATED APPLICATION

This application claims the benefit of provisional application Ser. No. 62/750,922, filed Oct. 26, 2018.

FIELD OF DISCLOSURE

The present disclosure relates to electrical submersible well pump assemblies, and in particular to a seal section with a check valve arrangement to expel motor lubricant when the lubricant expands due to a motor temperature increase, the check valve arrangement having a protective tube to retard well fluid contact with the check valve.

BACKGROUND

Electrical submersible pumps (ESP) are commonly used in hydrocarbon producing wells. An ESP includes a pump driven by an electrical motor filled with a motor lubricant. A seal section connected between the motor and the pump has a shaft seal to retard the entry of well fluid into contamination with the motor lubricant. The seal section also typically has a pressure equalizer that reduces a pressure differential between the motor lubricant and exterior well fluid. The pressure equalizer may be an elastomeric bag or a metal bellows. Motor lubricant in communication with motor lubricant in the motor fills the pressure equalizer. A well fluid port admits well fluid to a pressure equalizing chamber on the exterior of the pressure equalizer, causing the motor lubricant pressure in the motor to substantially equal the hydrostatic well fluid pressure.

During operation, the temperature of the motor will elevate, which causes the motor lubricant to expand. If the pressure equalizer is full and cannot expand more, a check valve will open to expel some of the motor lubricant into the pressure equalizing chamber. The check valve has one side exposed to the well fluid in the pressure equalizing chamber and an opposite side in communication with the motor lubricant in the pressure equalizer. The check valve needs to reseat when the motor cools down to keep well fluid out of the motor. The check valve is susceptible to damage from contact with well fluids in the pressure equalizing chamber. Contact with well fluid can foul the check valve mechanism with debris or degrade the components of the check valve due to material compatibility issues.

SUMMARY

A submersible well pump assembly for pumping well fluid includes a pump and a motor that drives the pump, the motor being filled with a motor lubricant. A housing having a longitudinal housing axis is operatively mounted to the motor. An expandable and contractible pressure equalizer within the housing defines a pressure equalizing chamber in the housing that surrounds an exterior of the pressure equalizer. A motor lubricant communication path communicates motor lubricant from the motor to an interior of the pressure equalizer. A well fluid inlet port in the housing admits well fluid into the pressure equalizing chamber. A check valve passage leads from the motor lubricant communication path to the pressure equalizing chamber. A dip tube has a dip tube inlet at the check valve passage and extends from the check valve passage into the pressure equalizing chamber. The dip tube has a dip tube outlet at a lower elevation relative to the housing axis than the dip tube inlet. A check valve in the check valve passage is at a higher elevation relative to the housing axis than the dip tube inlet and configured to expel motor lubricant from the motor lubricant communication path into the dip tube inlet when the pressure of the motor lubricant in the interior of the pressure equalizer is at a selected level above the pressure of the well fluid in the pressure equalizing chamber.

The dip tube may be filled initially with motor lubricant prior to installing the assembly in a well.

In one embodiment, the dip tube has at least one crest and at least one valley between the dip tube inlet and the dip tube outlet, the crest being at a higher elevation relative to the housing axis than the valley. The dip tube may have a plurality of crests, the crests being separated from each other by valleys of a lower elevation relative to the housing axis than the crests.

In one embodiment, the dip tube extends at least partially around the housing axis and has a labyrinth passage between the dip tube inlet and the dip tube outlet. The labyrinth passage has upper portions that are at higher elevations relative to the housing axis than lower portions. In the embodiment shown, the dip tube extends more than half way around the longitudinal axis of the housing and has an undulating configuration between the dip tube inlet and the dip tube outlet.

In another embodiment, the dip tube has a dip tube axis between the dip tube inlet and the dip tube outlet that is parallel to and offset from the housing axis. More particularly, the dip tube is a straight tubular member with a dip tube axis parallel to and offset from the housing axis. The dip tube outlet and the dip tube inlet are located on the dip tube axis.

In the embodiments shown, a guide tube extends through the housing along the housing axis. A drive shaft extends through the guide tube. The pressure equalizer comprises an elastomeric bag having a neck sealed to the guide tube, the neck defining a bag shoulder. The dip tube outlet is located at a higher elevation relative to the housing axis than the bag shoulder.

BRIEF DESCRIPTION OF THE DRAWINGS

FIG. 1 is an side view of an electrical submersible pump (ESP) having a seal section in accordance with this disclosure.

FIG. 2 is an axial sectional view of portions of the seal section of FIG. 1.

Figure 3:
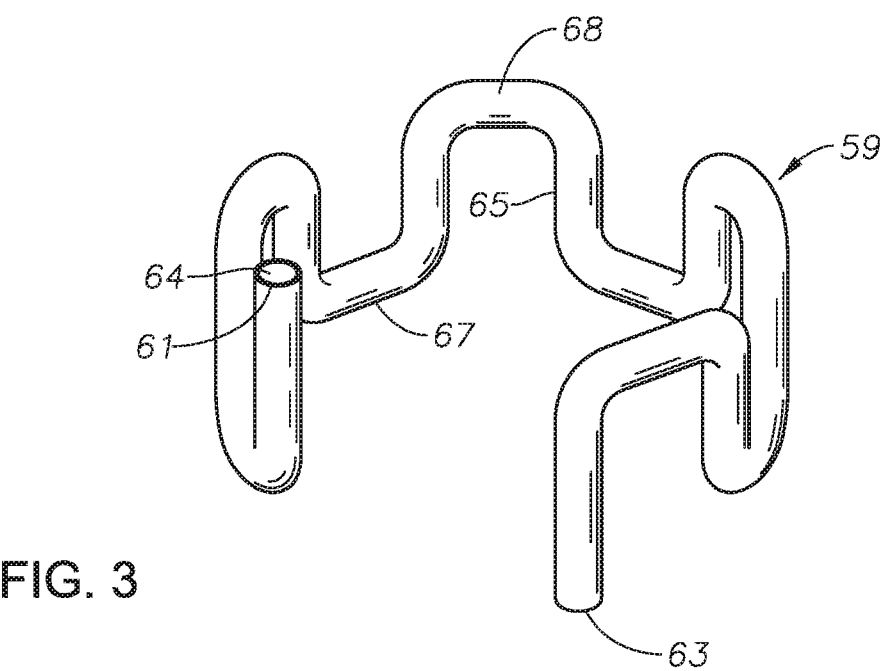
FIG. 3 is a perspective view of a serpentine dip tube for the check valve in the seal section of FIG. 2, the dip tube being shown removed from the seal section.

While the disclosure will be described in connection with the preferred embodiments, it will be understood that it is not intended to limit the disclosure to that embodiment. On the contrary, it is intended to cover all alternatives, modifications, and equivalents, as may be included within the scope of the claims.

DETAILED DESCRIPTION

The method and system of the present disclosure will now be described more fully hereinafter with reference to the accompanying drawings in which embodiments are shown.

The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 illustrates an electrical submersible well pump (ESP) 11 of a type commonly used to lift hydrocarbon production fluids from wells. ESP 11 has a centrifugal pump 13 with intake ports 15 for drawing in well fluid. Pump 13 could be made up of several similar pumps secured together in tandem by threaded fasteners or bolts, with intake ports 15 being in the lowermost pump. Intake ports 15 could also be in a separate module connected to pump 13. Further, if a rotary gas separator is employed below pump 13, intake ports 15 would be in the gas separator.

An electrical motor 17 is operatively mounted to and drives pump 13. Motor 17 contains a dielectric motor lubricant for lubricating the bearings within. A seal section 19 has a pressure equalizer that communicates with the lubricant in motor 17 and with the well fluid for reducing a pressure differential between the lubricant in motor 17 and the exterior well fluid. In this example, the pressure equalizing portion of seal section 19 locates between motor 17 and pump intake ports 15. Alternately, the pressure equalizing portion of seal section 19 could be located below motor 17, and other portions of seal section 19 could be above motor 17. The terms "upward", "downward", "above", "below" and the like are used only for convenience as ESP 11 may be operated in other orientations than vertical.

A string of production tubing 21 suspended within casing 23 supports ESP 11. In this example, pump 13 discharges into production tubing 21. Alternately, coiled tubing could support ESP 11, in which case pump 13 would discharge into the annulus around the coiled tubing. Motor 17 in that case would be located above pump 13. The power cable for motor 17 would be within the coiled tubing instead of alongside production tubing 21.

Referring to FIG. 2, seal section 19 has a tubular housing 25 that includes a head or pump end 27 and a base or motor end 29, each secured by threads to the tubular portion of housing 25. When connected into ESP 11 (FIG. 1), housing pump end 27 will be closer to pump 13 than it is to motor 17 and may be directly connected to the end of pump 13 having intake ports 15. Similarly, housing motor end 29 will be closer to motor 17 than it is to pump 13 and may be connected directly to motor 17. Alternately, housing motor end 29 could be connected to another seal section in tandem or to other pressure equalizing portions of seal section 19.

Housing 25 has a longitudinal axis 31 extending concentrically through housing pump end 27 and housing motor end 29. A drive shaft 33 with splined ends is rotated by motor 17 (FIG. 1) and extends along axis 31 through shaft passages 35 in housing pump end 27 and housing motor end 29. Bearings 36 in housing pump end 27 and in motor end 29 radially support shaft 33. Bearings 36 are located in shaft passages 35 and allow motor lubricant 37 to flow through them.

A primary shaft seal 39 seals around shaft 33 within housing pump end 27. In this embodiment, primary shaft seal 39 is a mechanical face seal that may be conventional. One side of primary shaft seal 39 will be immersed in well fluid and the other side in contact with motor lubricant 37.

Housing 25 has a pressure equalizer 41 between housing pump end 27 and housing motor end 29. In this example, pressure equalizer 41 comprises a flexible elastomeric bag or container. Alternately, metal bellows or labyrinth tubes and other labyrinth arrangements may serve as pressure equalizers. The lower end of bag 41 seals to housing motor end 29, and the upper end of bag 41 is in a sealing arrangement with housing pump end 27. The space between the exterior of bag 41 and housing 25 comprises a pressure equalizing chamber 43. A well fluid port 45 admits well fluid 46 into motor lubricant equalizing chamber 43. Well fluid port 45 is located at the bottom of pressure equalizing chamber 43 in this embodiment. This placement introduces well fluid 46 below the more buoyant motor lubricant 37 in pressure equalizing chamber 43.

A guide tube 47 extends coaxially through bag 45 around shaft 33. Guide tube 47 has a lower end sealed to housing motor end 29 in shaft passage 35. Guide tube 47 has an upper end sealed to housing pump end 27 in shaft passage 35 in housing pump end 27. In this example, the upper end of bag 41 has a neck 48 that seals around guide tube 47 at a place below housing pump end 27. A shoulder 50 connects neck 48 to the remaining portion of pressure equalizer 41.

Guide tube 51 has a larger inner diameter than an outer diameter of shaft 33, creating a shaft annulus 49 between shaft 33 and guide tube 47. One or more guide tube ports 51 extend through the side wall of guide tube 47 within the interior of bag 41. Guide tube ports 51 are closer to the upper end of bag 41 than to the lower end of bag 41 in this example.

Motor lubricant 37 in motor 17 (FIG. 1) is free to flow along a motor lubricant communication path into the interior of bag 41. The motor lubricant communication path passes through or around bearing 36 in the portion of shaft passage 35 within motor end 29. The communication path includes shaft annulus 49 and guide tube ports 51, which lead into the interior of bag 41. The communication path also allows motor lubricant 37 to pass through or around bearing 36 in pump end 27 up to a lower side of primary shaft seal 39.

Threaded bolt holes 53 may be formed in the upper side of housing pump end 27 for connecting seal section 19 to another module, such as pump 13 (FIG. 1). Alternately, the connection could be made by a rotatable threaded collar.

A check valve passage 55 within housing pump end 27 leads from shaft passage 35 laterally outward, then downward through a lower end of housing pump end 27 into pressure equalizing chamber 43. A check valve 57, which may be conventional, is mounted in check valve passage 55 near its lower end. Alternately, check valve 57 could be secured to and extend downward from the lower end of check valve passage 55 into pressure equalizing chamber 43. In that instance, check valve 57 would be below the downward facing lower end of pump end 27. Check valve 57 is schematically illustrated to comprise a ball urged upward against a seat by a spring. The upper side of check valve 57 is exposed to motor lubricant 37 in check valve passage 55.

A labyrinth or dip tube 59 has a dip tube inlet 61 secured to a lower portion of check valve passage 55 below check valve 57. Dip tube 59 extends downward into pressure equalizing chamber 43 and has a dip tube outlet 63 that is at an elevation below dip tube inlet 61. Dip tube outlet 63 is closer to bag 41 than dip tube inlet 61. In this embodiment, dip tube 59 extends at least partially around guide tube 47 and has an undulating or serpentine configuration defining a tortuous or labyrinth flow passage 64 through it. In this example, as shown in FIG. 3, dip tube 59 extends circumferentially more than 180 degrees from dip tube inlet 61 to dip tube outlet 63. Dip tube 59 is located in a space between pressure equalizer shoulder 50 and housing pump end 27. Dip tube outlet 63 is illustrated as being above pressure equalizer shoulder 50.

In this example, dip tube 59 has several upright portions 65 that may be vertical or parallel to axis 31 (FIG. 2) as shown. Alternately, upright portions 65 may slope upward and downward. Upright portions 65 join valleys 67 to crests 68, which are at higher elevations than crests 67. Valleys 67 and crests 68 extend circumferentially and may be curved or straight as illustrated. In this embodiment, dip tube 59 is located entirely above bag 41.

Prior to installing ESP 11, motor 17 and seal section 19 will be filled with motor lubricant 37. The filling procedure results in motor lubricant 37 being initially within shaft passage 35 in motor end 29, shaft annulus 49, the interior of bag 41, shaft passage 35 in pump end 27, check valve passage 55, dip tube 59, and in pressure equalizing chamber 43. As ESP 11 is lowered into casing 27, well fluid 46 in casing 27 will enter well fluid inlet port 45 into contact with motor lubricant 37 in pressure equalizing chamber 43. Well fluid 46 is often primarily water and does not mix easily with motor lubricant 37, which is lighter in density. Consequently, well fluid 46 tends to gravitate to a lower portion of pressure equalizing chamber 43.

The hydrostatic pressure of well fluid 46 and motor lubricant 37 within pressure equalizing chamber 43 exerts a contracting force on bag 41, causing motor lubricant 37 within the interior of bag 41, shaft annulus 49, shaft passages 35, check valve passage 55 and in dip tube 59 to pressure equalize. Even though the pressures on the upper and lower sides of check valve 57 are substantially the same, check valve 57 will remain closed because of the bias force of its spring.

When ESP 11 begins to operate, motor 17 will get hotter, which causes motor lubricant 37 to expand in volume. When bag 41 is fully expanded, the pressure of motor lubricant 37 in bag 41 will rise above the hydrostatic pressure of well fluid 46 in pressure equalizing chamber 43. When the differential pressure on check valve 57 reaches a selected level, check valve 57 will open, allowing motor lubricant 37 in check valve passage 55 to flow downward into dip tube 59, as indicated by the arrows. The differential that causes check valve 57 to open may be small, only a few pounds per square inch. The flow of motor lubricant 37 into dip tube 59 results in some motor lubricant 37 flowing out dip tube outlet 63 into pressure equalizing chamber 43.

When ESP 11 is shut down, motor 17 cools and motor lubricant 37 contracts. The pressure differential on check valve 57 drops to a level below its set amount, causing check valve 57 to close. Some of the motor lubricant 37 and well fluid 46 within pressure equalizing chamber 43 may migrate upward into dip tube outlet 63. The fluid entering well fluid outlet 63 may include droplets of well fluid 46. It will be difficult for any well fluid 46 entering well fluid outlet 63 to migrate through the upright portions 65, valleys 67 and crests 68 because the well fluid 46 is heavier than the motor lubricant 37 within dip tube 59. The well fluid 46 would have to migrate upward and downward in dip tube passage 64 as it passes through upright portions 65, valleys 67 and crests 68 toward dip tube inlet 61. The upward and downward portions of flow passage 64 in dip tube 59 reduces the chance for well fluid 46, along with debris, from coming into contact with the lower side of check valve 57.

Figure 4:
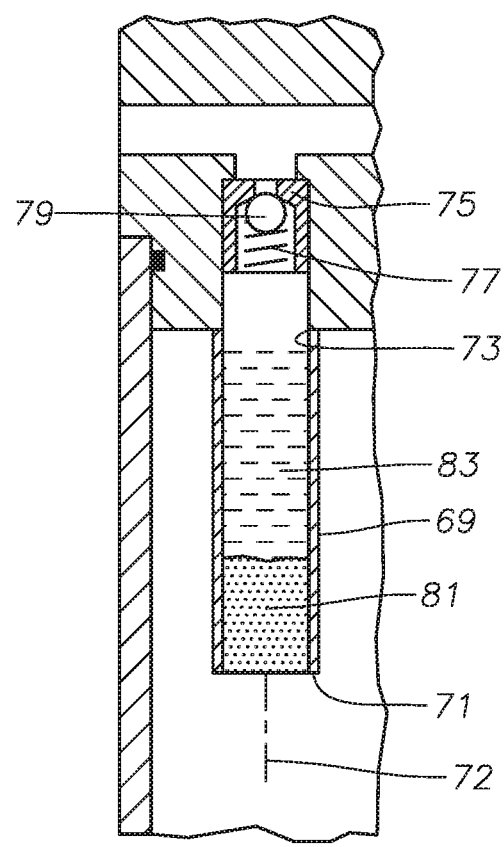
FIG. 4 is a sectional view of a portion of the seal section of FIG. 1, illustrating an alternate embodiment of a dip tube for the check valve of the seal section of FIG. 2.

In the alternate embodiment of FIG. 4, dip tube 69 is a straight tube with its outlet 71 directly below its inlet 73. A central longitudinal axis 72 of dip tube 69 is parallel to and offset from housing longitudinal axis 31. Dip tube 69 may have different lengths, but in this embodiment, its outlet 71 is above pressure equalizer shoulder 50 (FIG. 2). Dip tube 69 will be directly below check valve 75. Check valve 75 may be the same as check valve 57 (FIG. 2), having a spring 77 that urges a movable element, such as a ball 79, upward against a seat. Dip tube 69 operates in the same manner as dip tube 59 (FIG. 3), requiring any well fluid 81 that may enter dip tube outlet 71 to migrate upward through the less dense motor lubricant 83 in dip tube 69. Dip tube 69 retards well fluid 81 from contacting the seat of check valve 75.

The present disclosure described herein, therefore, is well adapted to carry out the objects and attain the ends and advantages mentioned, as well as others inherent therein. While two embodiments of the disclosure have been given for purposes of disclosure, numerous changes exist in the details of procedures for accomplishing the desired results. These and other similar modifications will readily suggest themselves to those skilled in the art, and are intended to be encompassed within the scope of the appended claims.

The invention claimed is:

1. A submersible well pump assembly for pumping well fluid, comprising:
   a pump;
   a motor that drives the pump, the motor being filled with a motor lubricant;
   a housing having a longitudinal housing axis and operatively mounted to the motor;
   an expandable and contractible pressure equalizer within the housing, defining a pressure equalizing chamber in the housing that surrounds an exterior of the pressure equalizer;
   a motor lubricant communication path for communicating motor lubricant from the motor to an interior of the pressure equalizer;
   a well fluid inlet port in the housing for admitting well fluid into the pressure equalizing chamber;
   a check valve passage leading from the motor lubricant communication path to the pressure equalizing chamber;
   a dip tube having a dip tube inlet at the check valve passage and extending from the check valve passage into the pressure equalizing chamber;
   a check valve in the check valve passage at a higher elevation relative to the housing axis than the dip tube inlet and configured to expel motor lubricant from the motor lubricant communication path into the dip tube inlet when the pressure of the motor lubricant in the interior of the pressure equalizer is at a selected level above the pressure of the well fluid in the pressure equalizing chamber; and wherein:
   the dip tube has at least one crest and at least one valley between the dip tube inlet and the dip tube outlet, the crest being at a higher elevation relative to the housing axis than the valley.

2. The assembly according to claim 1, wherein:
   the dip tube is filled initially with motor lubricant prior to installing the assembly in a well.

3. The assembly according to claim 1, wherein:
the at least one crest comprises a plurality of the crests and the at least one valley comprises a plurality of the valleys, the crests being separated from each other by the valleys.

4. The assembly according to claim 1, further comprising:
a guide tube extending through the housing along the housing axis;
a drive shaft extending through the guide tube; wherein the pressure equalizer comprises an elastomeric bag having a neck sealed to the guide tube, the neck defining a bag shoulder; and
the dip tube outlet is located at a higher elevation relative to the housing axis than the bag shoulder.

5. A submersible well pump assembly for pumping well fluid, comprising:
a pump;
a motor that drives the pump, the motor being filled with a motor lubricant;
a housing having a longitudinal housing axis and operatively mounted to the motor;
an expandable and contractible pressure equalizer within the housing, defining a pressure equalizing chamber in the housing that surrounds an exterior of the pressure equalizer;
a motor lubricant communication path for communicating motor lubricant from the motor to an interior of the pressure equalizer;
a well fluid inlet port in the housing for admitting well fluid into the pressure equalizing chamber;
a check valve passage leading from the motor lubricant communication path to the pressure equalizing chamber;
a dip tube having a dip tube inlet at the check valve passage and extending from the check valve passage into the pressure equalizing chamber;
a check valve in the check valve passage at a higher elevation relative to the housing axis than the dip tube inlet and configured to expel motor lubricant from the motor lubricant communication path into the dip tube inlet when the pressure of the motor lubricant in the interior of the pressure equalizer is at a selected level above the pressure of the well fluid in the pressure equalizing chamber; and wherein:
the dip tube extends at least partially around the housing axis and has a labyrinth passage between the dip tube inlet and the dip tube outlet, the labyrinth passage having upper portions that are at higher elevations relative to the housing axis than lower portions.

6. The assembly according to claim 5, wherein:
the dip tube extends more than half way around the longitudinal axis of the housing.

7. The assembly according to claim 5, wherein:
the outlet of the dip tube is at a lower elevation relative to the housing axis than the dip tube inlet.

8. A submersible well pump assembly for pumping well fluid, comprising:
a pump;
a motor that drives the pump, the motor being filled with a motor lubricant;
a housing having a longitudinal housing axis and operatively mounted to the motor;
an expandable and contractible pressure equalizer within the housing, defining a pressure equalizing chamber in the housing that surrounds an exterior of the pressure equalizer;
a motor lubricant communication path for communicating motor lubricant from the motor to an interior of the pressure equalizer;
a well fluid inlet port in the housing for admitting well fluid into the pressure equalizing chamber;
a check valve passage leading from the motor lubricant communication path to the pressure equalizing chamber;
a dip tube having a dip tube inlet at the check valve passage and extending from the check valve passage into the pressure equalizing chamber, the dip tube having a dip tube outlet at a lower elevation relative to the housing axis than the dip tube inlet;
a check valve in the check valve passage at a higher elevation relative to the housing axis than the dip tube inlet and configured to expel motor lubricant from the motor lubricant communication path into the dip tube inlet when the pressure of the motor lubricant in the interior of the pressure equalizer is at a selected level above the pressure of the well fluid in the pressure equalizing chamber; and wherein:
the dip tube has a dip tube axis between the dip tube inlet and the dip tube outlet that is parallel to and offset from the housing axis.

9. A submersible well pump assembly for pumping well fluid, comprising:
a pump;
a motor that drives the pump, the motor being filled with a motor lubricant;
a housing having a longitudinal housing axis and mounted between the motor and the pump, the housing having pump end and a motor end;
a guide tube extending within the housing between the pump end and the motor end;
a shaft extending from the pump end to the motor end within the guide tube;
an expandable and contractible pressure equalizer surrounding the guide tube within the housing, defining a pressure equalizing chamber in the housing that surrounds an exterior of the pressure equalizer;
a motor lubricant communication path for communicating motor lubricant through the guide tube around the shaft from the motor to an interior of the pressure equalizer;
a well fluid inlet port in the housing for admitting well fluid into the pressure equalizing chamber;
a check valve passage in the pump end leading from the motor lubricant communication path to the pressure equalizing chamber, the check valve passage having a check valve passage outlet portion leading to a lower side of the pump end;
a check valve in the check valve passage outlet portion configured to expel motor lubricant from the motor lubricant communication path when the pressure of the motor lubricant in the interior of the pressure equalizer is at a selected level above the pressure of the well fluid in the pressure equalizing chamber;
a dip tube having a dip tube inlet at the check valve passage outlet portion below the check valve and a dip tube outlet;
the dip tube is filled with motor lubricant to retard migration of well fluid from the pressure equalizing chamber into contact with the check valve; wherein:
the dip tube has an undulating portion between the dip tube inlet and the dip tube outlet; and
the undulating portion has at least one crest and at least one valley, the at least one crest being closer to the lower side of the pump end than the valley.

10. The assembly according to claim 9, wherein:
the dip tube extends at least partially around the housing axis and the dip tube outlet is in the pressure equalizing chamber below the lower side of the pump end.

11. The assembly according to claim 9, wherein:
the pressure equalizer comprises an elastomeric bag having a neck sealed to the guide tube, the neck defining a bag shoulder facing the lower side of the pump end; and the dip tube is located between the bag shoulder and the lower side of the housing.

12. A method of retarding entry of well fluid into contact with a pressure equalizer motor lubricant check valve in a check valve passage of a pump end of a seal section of a submersible pump assembly, the seal section having a pressure equalizer that defines on its exterior a pressure equalizing chamber, the method comprising:

mounting a dip tube to the check valve passage such that the dip tube has a dip tube inlet below the check valve and a dip tube outlet;

filling the pressure equalizer, the check valve passage, the pressure equalizing chamber and the dip tube with motor lubricant; then lowering the pump assembly into a well; wherein mounting the dip tube comprises:

providing the dip tube with an undulating configuration between the dip tube inlet and the dip tube outlet, the undulating configuration having at least one upper portion closer to the pump end than a lower portion.

13. The method according to claim 12, wherein mounting the dip tube comprises:

extending the undulating portion at least partly around an axis of the seal section.

14. The method according to claim 12, wherein mounting the dip tube comprises placing the dip tube outlet in the pressure equalizing chamber below the pump end.

15. The method according to claim 12, further comprising:

after installing the pump assembly in the well, opening the check valve and expelling motor lubricant from the pressure equalizer through the dip tube in response to thermal expansion of the motor lubricant.

\* \* \* \* \*